US011998876B2

(12) United States Patent
Connor, Jr. et al.

(10) Patent No.: US 11,998,876 B2
(45) Date of Patent: Jun. 4, 2024

(54) DIAGNOSTIC METHODS AND APPARATUS FOR ELECTRODIALYSIS

(71) Applicant: MIS IP Holdings, LLC, Houston, TX (US)

(72) Inventors: Michael James Connor, Jr., Porter, TX (US); Brian M. McDonald, Austin, TX (US); Ethan Demeter, The Woodlands, TX (US); Thomas Beales, Houston, TX (US)

(*) Notice: Subject to any disclaimer, the term of this patent is extended or adjusted under 35 U.S.C. 154(b) by 0 days.

(21) Appl. No.: 18/321,887

(22) Filed: May 23, 2023

(65) Prior Publication Data

US 2023/0285902 A1 Sep. 14, 2023

Related U.S. Application Data

(62) Division of application No. 16/600,416, filed on Oct. 11, 2019, now Pat. No. 11,701,619.

(Continued)

(51) Int. Cl.
*B01D 53/22* (2006.01)
*B01D 61/48* (2006.01)
(Continued)

(52) U.S. Cl.
CPC .......... *B01D 61/485* (2013.01); *B01D 61/52* (2013.01); *B01D 63/0821* (2022.08); *B01D 2311/2623* (2013.01); *B01D 2313/143* (2013.01); *B01D 2313/345* (2013.01); *B01D 2313/70* (2022.08); *B01D 2325/42* (2013.01)

(58) Field of Classification Search
CPC .. B01D 61/485; B01D 63/0821; B01D 61/52; B01D 2313/70; B01D 2311/2623; B01D 2313/143; B01D 2313/345; B01D 2325/42

See application file for complete search history.

(56) References Cited

U.S. PATENT DOCUMENTS 345,254 A 7/1886 Norton et al.
1,305,052 A 5/1919 Berkley
(Continued)

FOREIGN PATENT DOCUMENTS

ES 2390300 11/2012
WO 2017/019542 2/2017
WO 2018/106186 6/2018

OTHER PUBLICATIONS

Demeter et al., U.S. Office Action dated Jun. 13, 2023, directed to U.S. Appl. No. 18/098,379; 9 pages.

(Continued)

*Primary Examiner* — Anthony R Shumate
(74) *Attorney, Agent, or Firm* — MORRISON & FOERSTER; Nathan Vogler

(57) ABSTRACT

The present disclosure is directed to ion-exchange systems and devices that can monitor key parameters related to the performance of the ion-exchange device. Specifically, the ion-exchange systems and devices disclosed herein can provide real time voltage drop across groups of membrane pairs using diagnostic spacer borders between the pairs. In addition, the ion-exchange systems and devices disclosed herein can monitor the compression force applied by the compression plates holding the ion-exchange systems and devices together.

5 Claims, 22 Drawing Sheets

Representative side view of electrodialysis system

Related U.S. Application Data

(60) Provisional application No. 62/745,010, filed on Oct. 12, 2018.

(51) Int. Cl.
  *B01D 61/52* (2006.01)
  *B01D 63/08* (2006.01)

(56) References Cited

U.S. PATENT DOCUMENTS

| | | | |
|---|---|---|---|
| 2,782,337 A | | 2/1957 | Robinson |
| 3,993,517 A | | 11/1976 | Schneider |
| 5,681,438 A | | 10/1997 | Proulx |
| 8,641,690 B2 | * | 2/2014 | Fitzpatrick ......... A61B 17/1325 |
| | | | 602/53 |
| 2002/0149296 A1 | * | 10/2002 | Fujii ................... H10N 30/2047 |
| | | | 310/328 |
| 2003/0090270 A1 | | 5/2003 | Lagmanson |
| 2004/0011723 A1 | | 1/2004 | Bradford et al. |
| 2005/0051485 A1 | | 3/2005 | Saini |
| 2007/0228893 A1 | * | 10/2007 | Yamauchi ............. H04R 17/00 |
| | | | 310/348 |
| 2008/0029395 A1 | | 2/2008 | Fan |
| 2009/0139650 A1 | * | 6/2009 | Hardwicke .......... B01D 63/103 |
| | | | 427/244 |
| 2010/0078327 A1 | | 4/2010 | Noh et al. |
| 2010/0308842 A1 | | 12/2010 | Coster et al. |
| 2011/0034069 A1 | | 2/2011 | Jacob |
| 2011/0121574 A1 | * | 5/2011 | Konishi ................. B01D 63/12 |
| | | | 290/54 |
| 2011/0222667 A1 | * | 9/2011 | Gregerson ........... A61B 6/4435 |
| | | | 378/198 |
| 2012/0181890 A1 | | 7/2012 | Kleber et al. |
| 2012/0318724 A1 | * | 12/2012 | Brown ................... B01D 63/16 |
| | | | 210/138 |
| 2013/0341264 A1 | | 12/2013 | Kidwell |
| 2014/0008210 A1 | * | 1/2014 | Guia ................... A61M 1/3679 |
| | | | 204/518 |
| 2014/0151298 A1 | * | 6/2014 | Harris .................. B01D 65/02 |
| | | | 210/636 |
| 2015/0376036 A1 | | 12/2015 | Kedem et al. |
| 2016/0008763 A1 | | 1/2016 | Roderick et al. |
| 2016/0333287 A1 | | 11/2016 | Zou et al. |
| 2017/0029586 A1 | | 2/2017 | Van Engelen et al. |
| 2017/0291141 A1 | * | 10/2017 | Dunham ................ B01D 61/06 |
| 2018/0093030 A1 | | 4/2018 | Hestekin |
| 2018/0141834 A1 | | 5/2018 | Wessling et al. |
| 2018/0345224 A1 | * | 12/2018 | Li .......................... B01D 63/12 |
| 2019/0015784 A1 | | 1/2019 | Cantrell |
| 2019/0101524 A1 | * | 4/2019 | Han ................. B01D 67/00791 |
| 2019/0111393 A1 | | 4/2019 | Winter et al. |
| 2019/0143275 A1 | | 5/2019 | Arnusch et al. |
| 2019/0388843 A1 | | 12/2019 | Demeter |
| 2020/0114314 A1 | | 4/2020 | Connor, Jr. et al. |
| 2020/0269244 A1 | * | 8/2020 | Hwang ................. B01D 61/18 |
| 2020/0306697 A1 | | 10/2020 | Kutowy et al. |
| 2022/0143554 A1 | | 5/2022 | Ghaffour et al. |

OTHER PUBLICATIONS

Connor et al., U.S. Office Action dated Oct. 3, 2022, directed to U.S. Appl. No. 16/600,416; 14 pages.

Demeter et al., U.S. Office Action dated Jun. 13, 2022, directed to U.S. Appl. No. 16/449,951; 10 pages.

Demeter et al., U.S. Appl. No. 62/689,357, filed Jun. 25, 2018.

Dolezel et al. (Jul. 21, 2017). "Measurement of Non-Effective Electric Current in Electrodialysis Stacks," Journal of The Electrochemical Society 164(9): E276-E282.

International Search Report and Written Opinion dated Oct. 3, 2019, directed to International Application No. PCT/US19/38751; 12 pages.

Murray, P. ed. (1995). "Electrodialysis and Electrodialysis Reversal: Manual of Water Supply Practices," American Water Works Association; 63 pages.

Siddiqui et al. (2016). "Development and Characterization of 3D-Printed Feed Spacers for Spiral Wound Membrane Systems," Water Research: 22 pages.

* cited by examiner

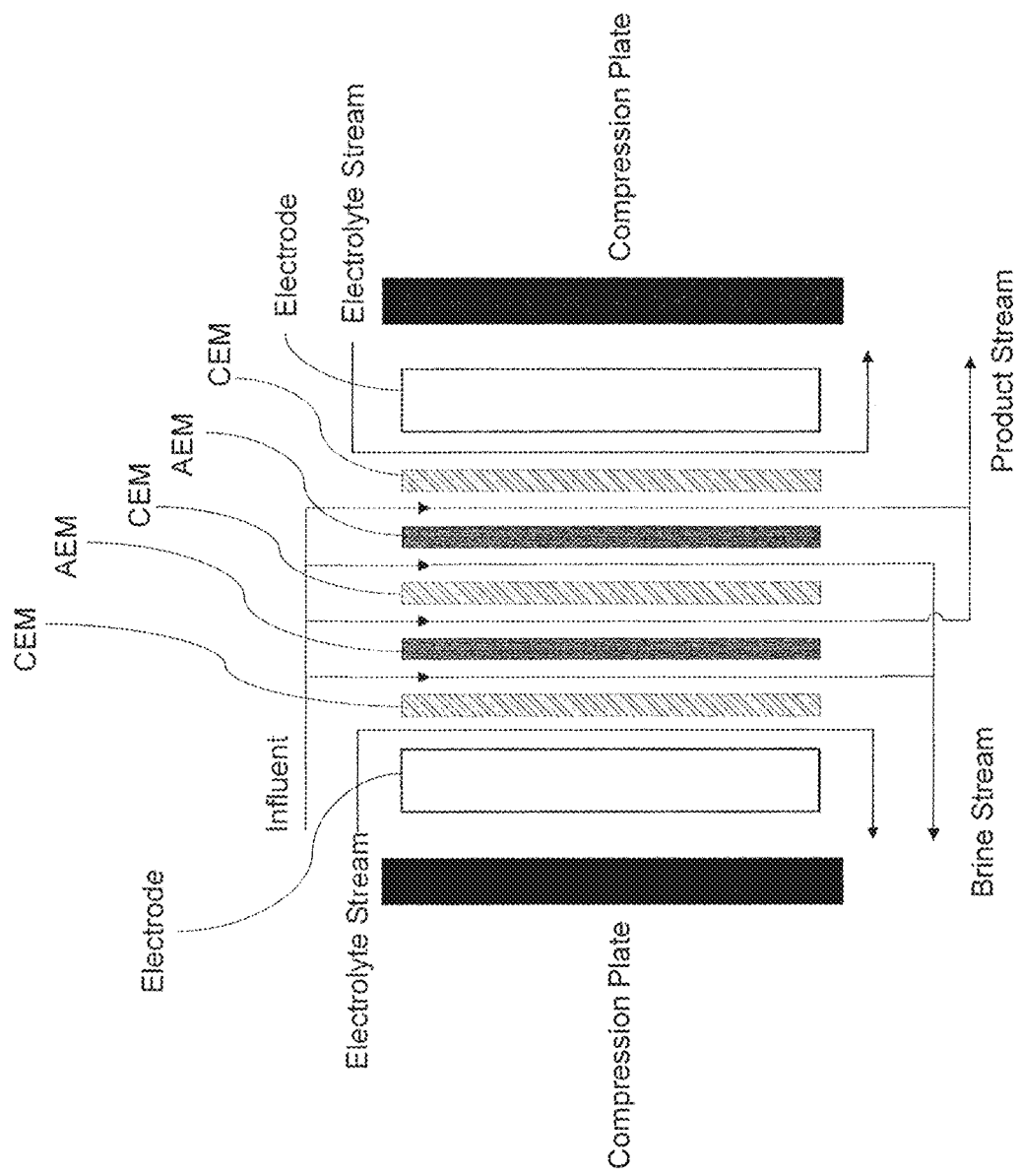
FIG. 1 – Representative side view of electrodialysis system

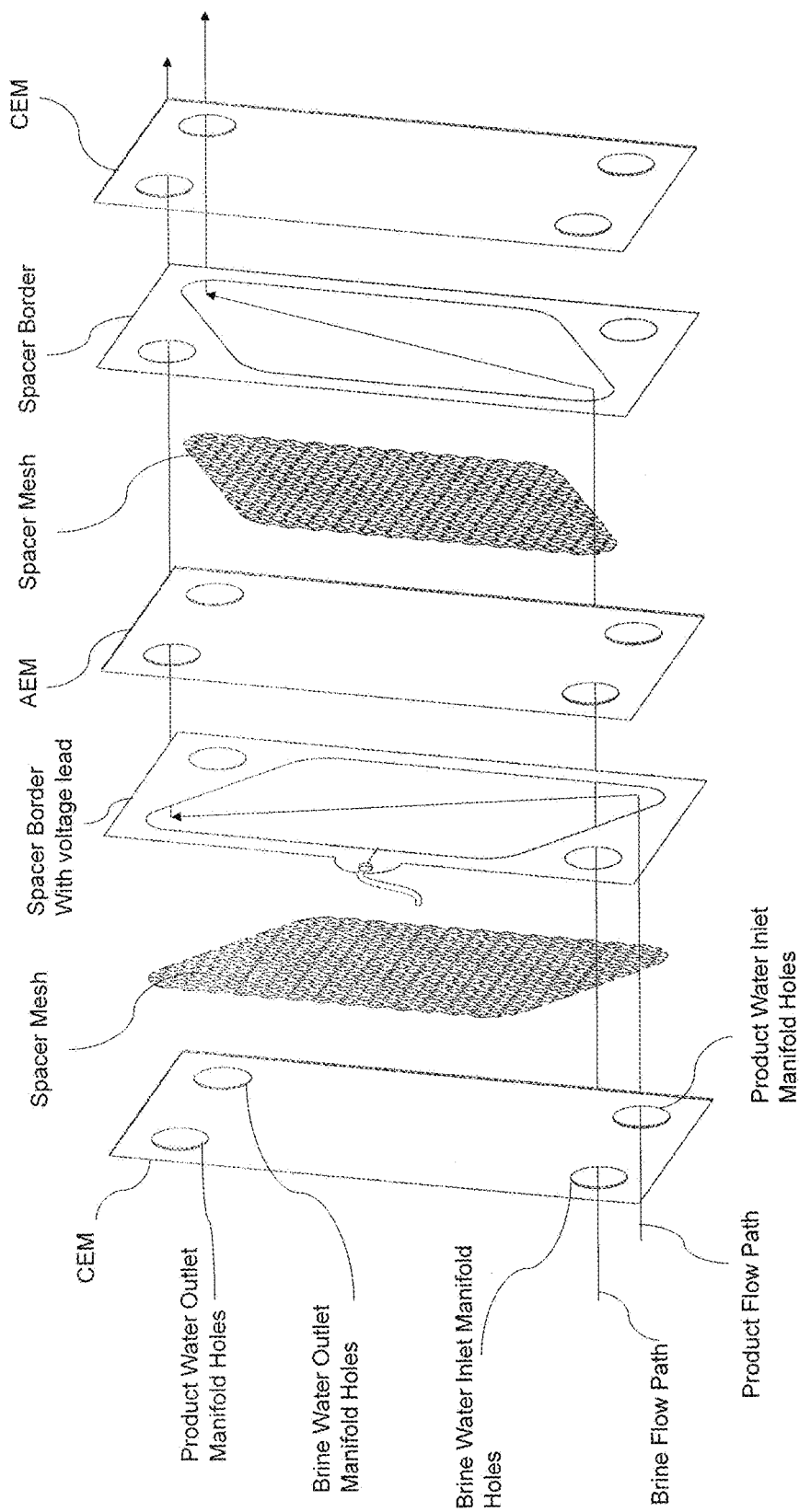
FIG. 2 – Exploded view showing flow through spacers

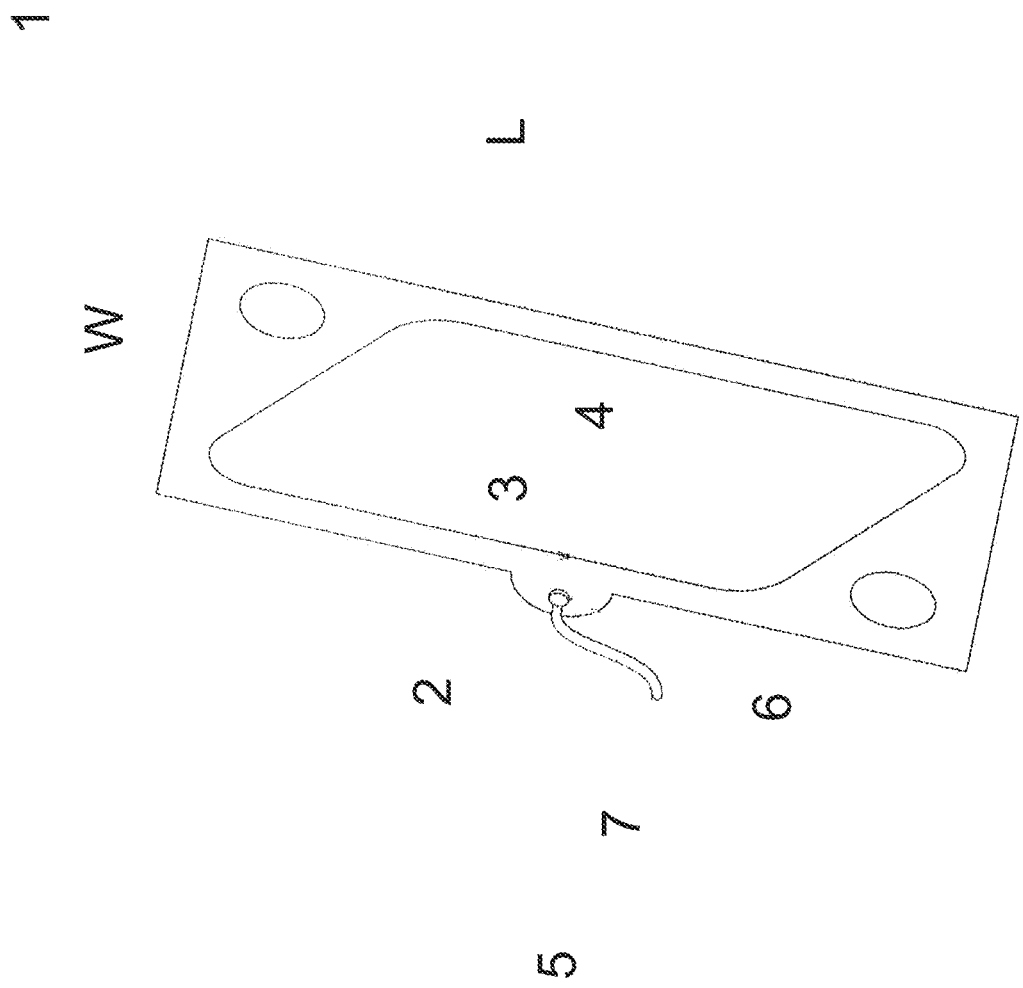
FIG. 3 – Isometric view of spacer with embedded voltage lead

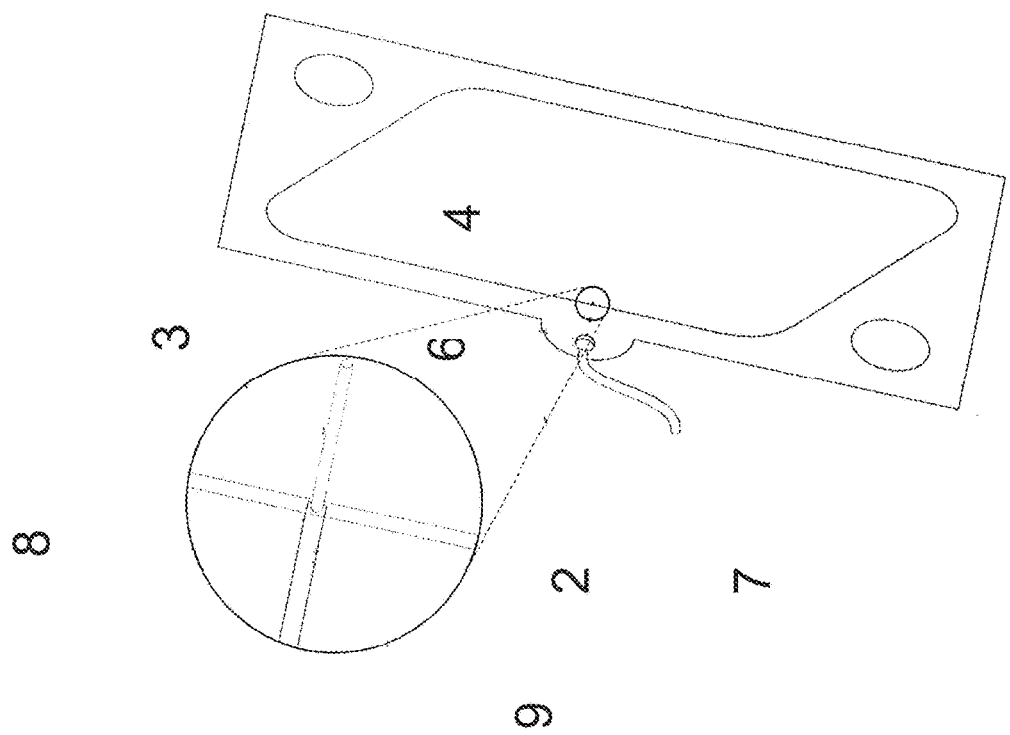
FIG. 4 – Close up view of embedded voltage lead

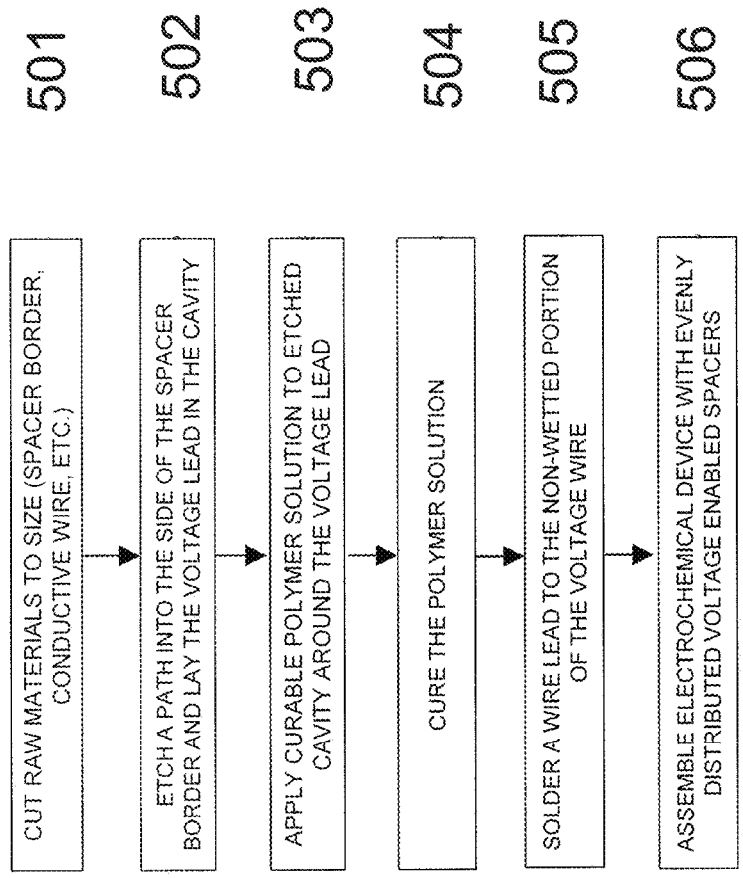
FIG. 5 – Manufacturing process for embedded voltage sensor

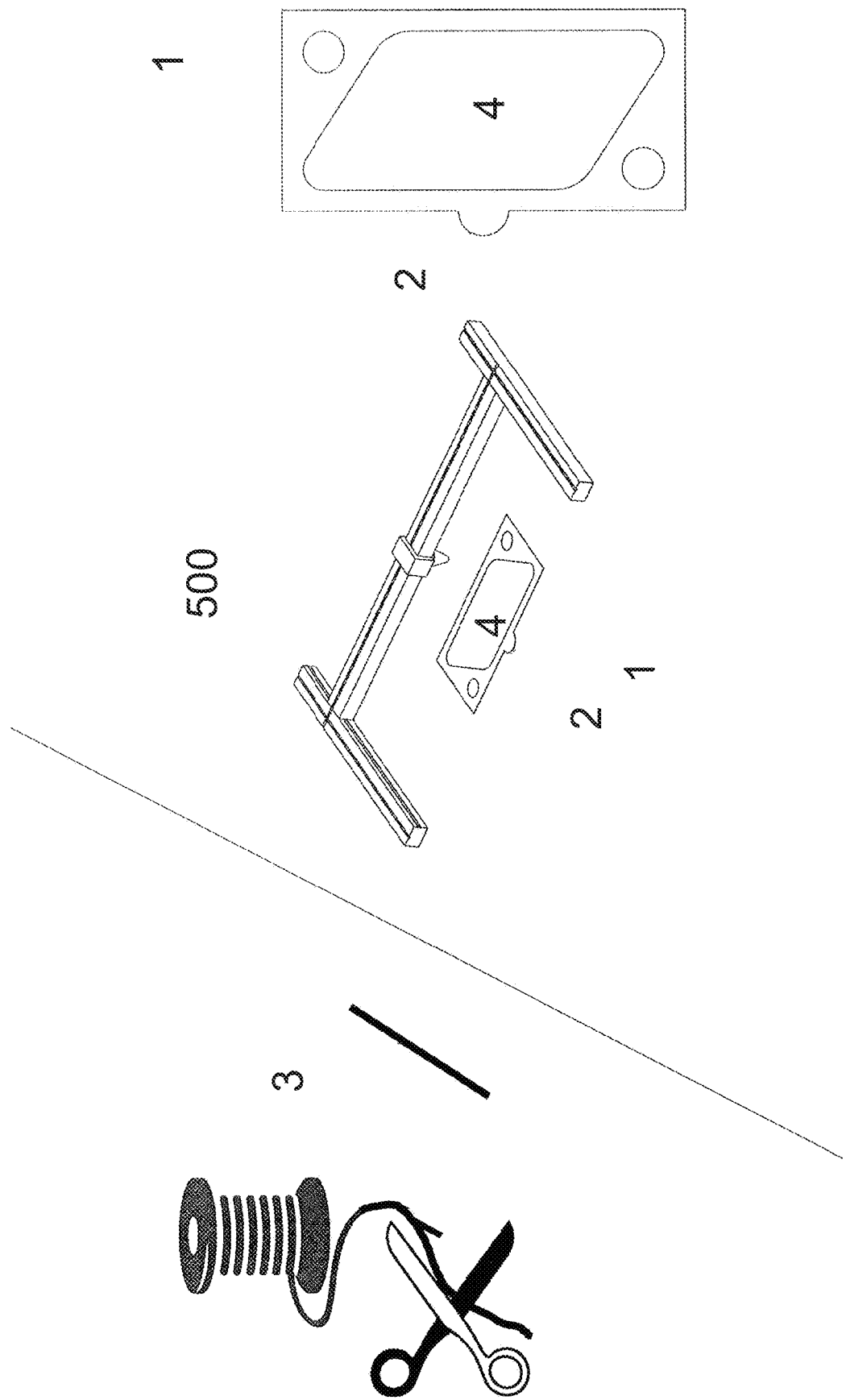
FIG. 5a - Conductive Wire and Spacer Border Cut to Size

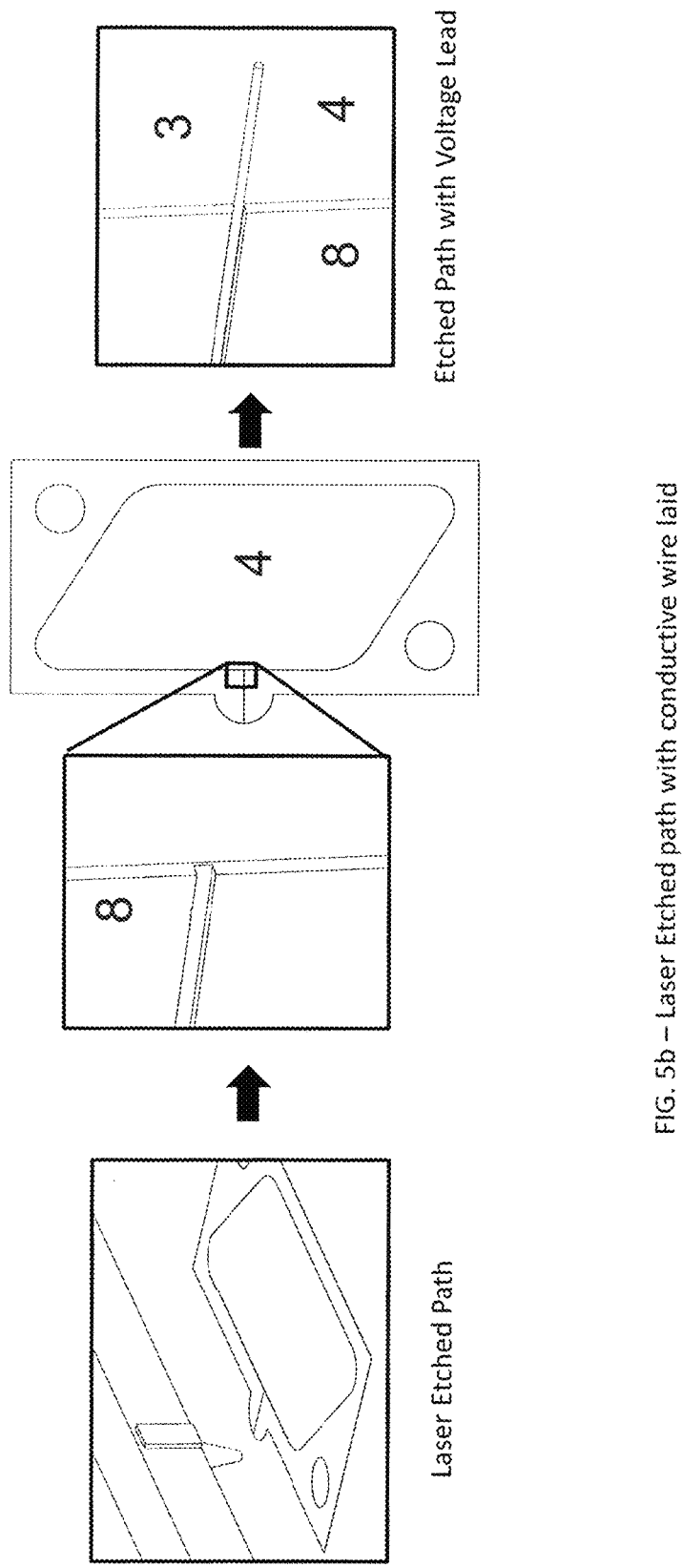
FIG. 5b – Laser Etched path with conductive wire laid

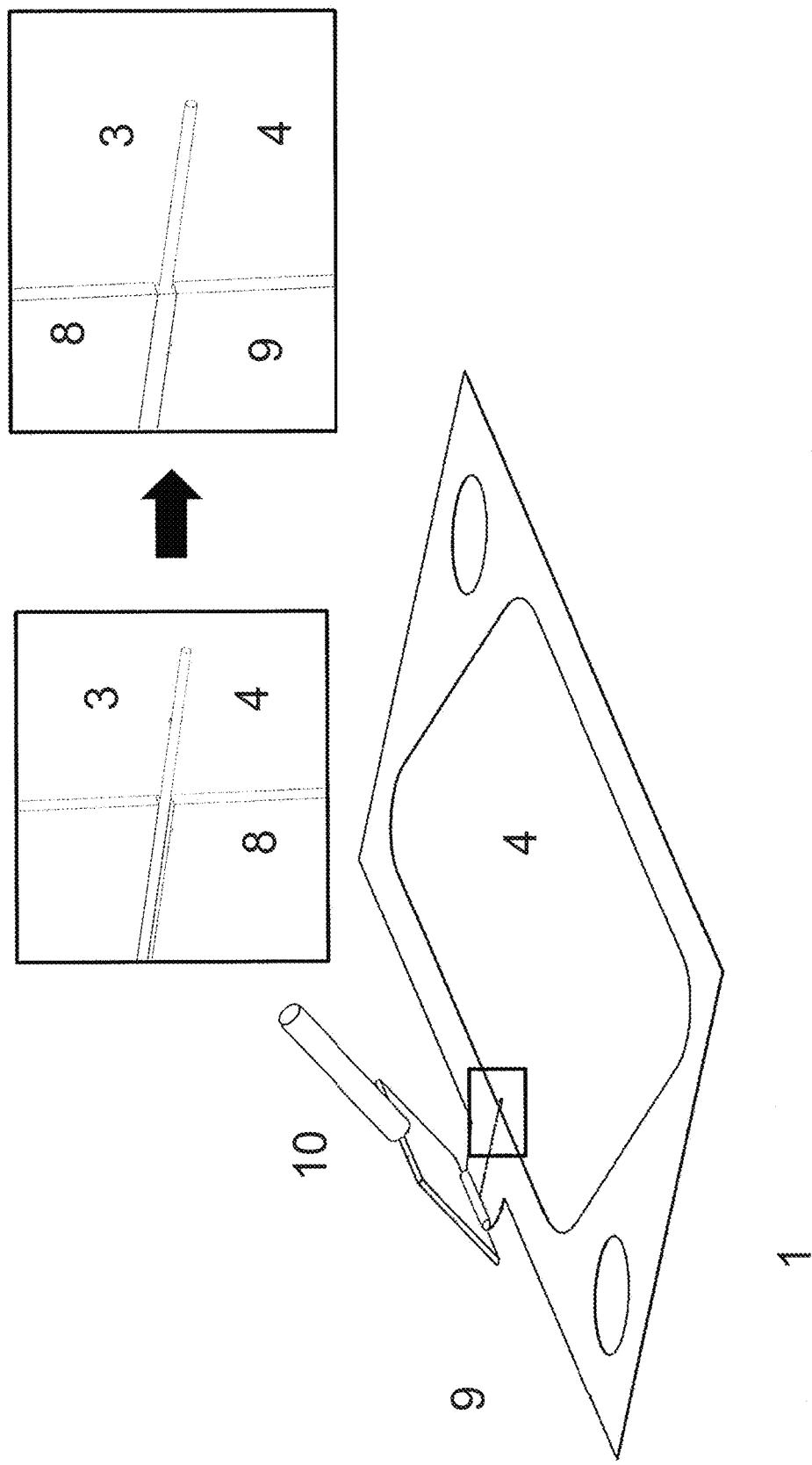
FIG. 5c – Apply Curable Polymer Solution to Etched Cavity

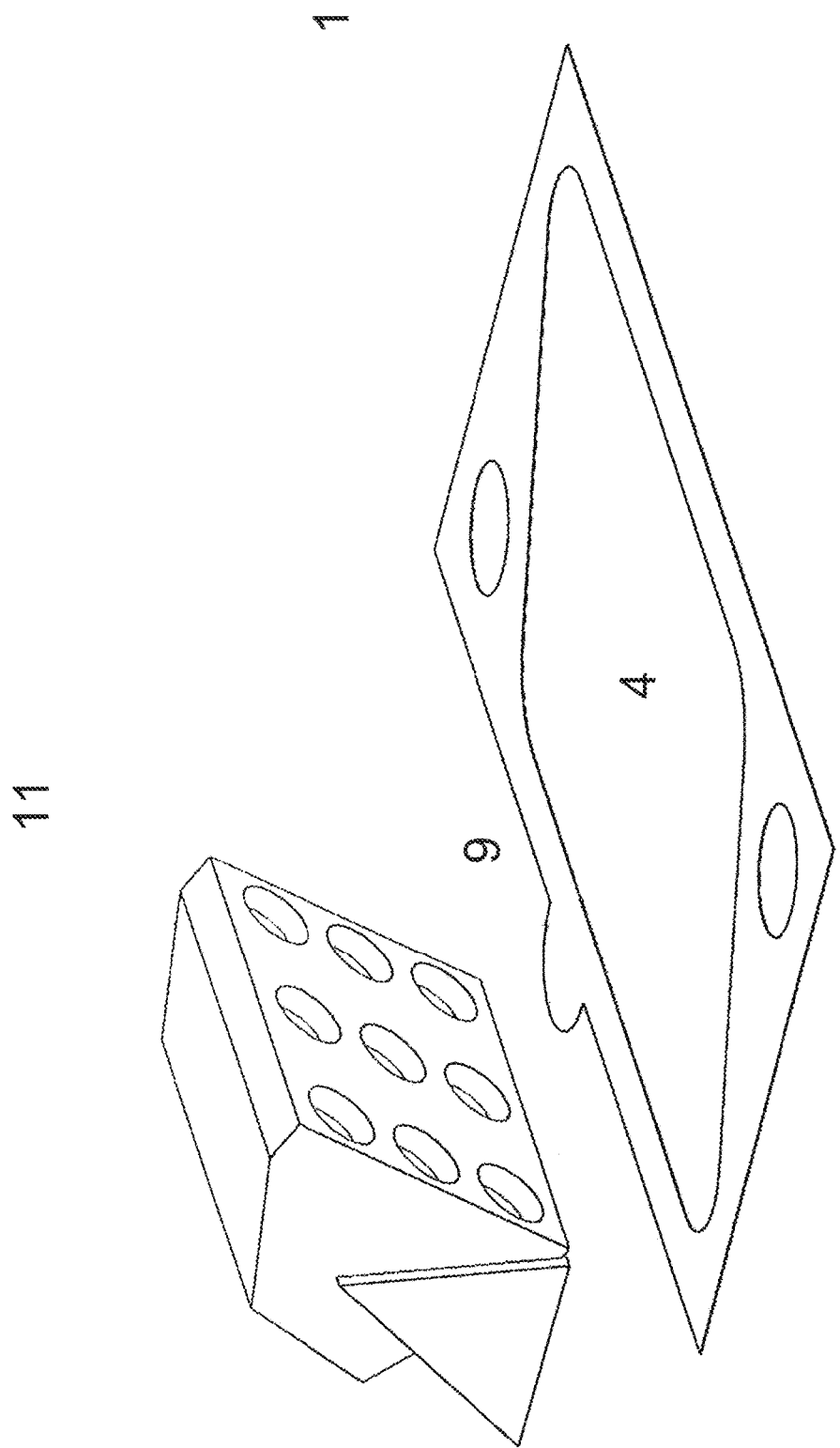
FIG. 5d – Cure Polymer Solution

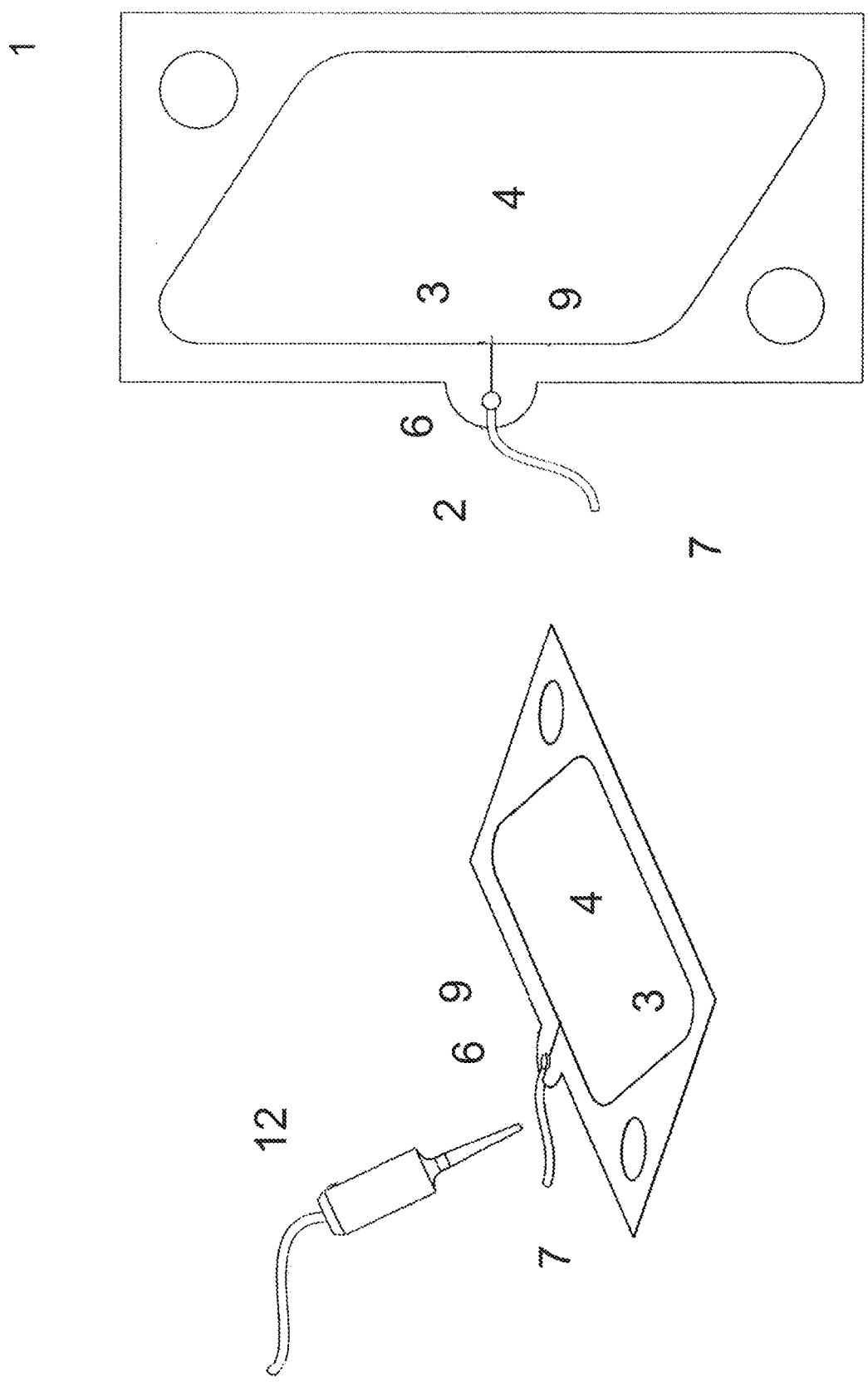
FIG. 5e – Solder Wire Lead to Non-Wetted Portion of the Voltage Lead

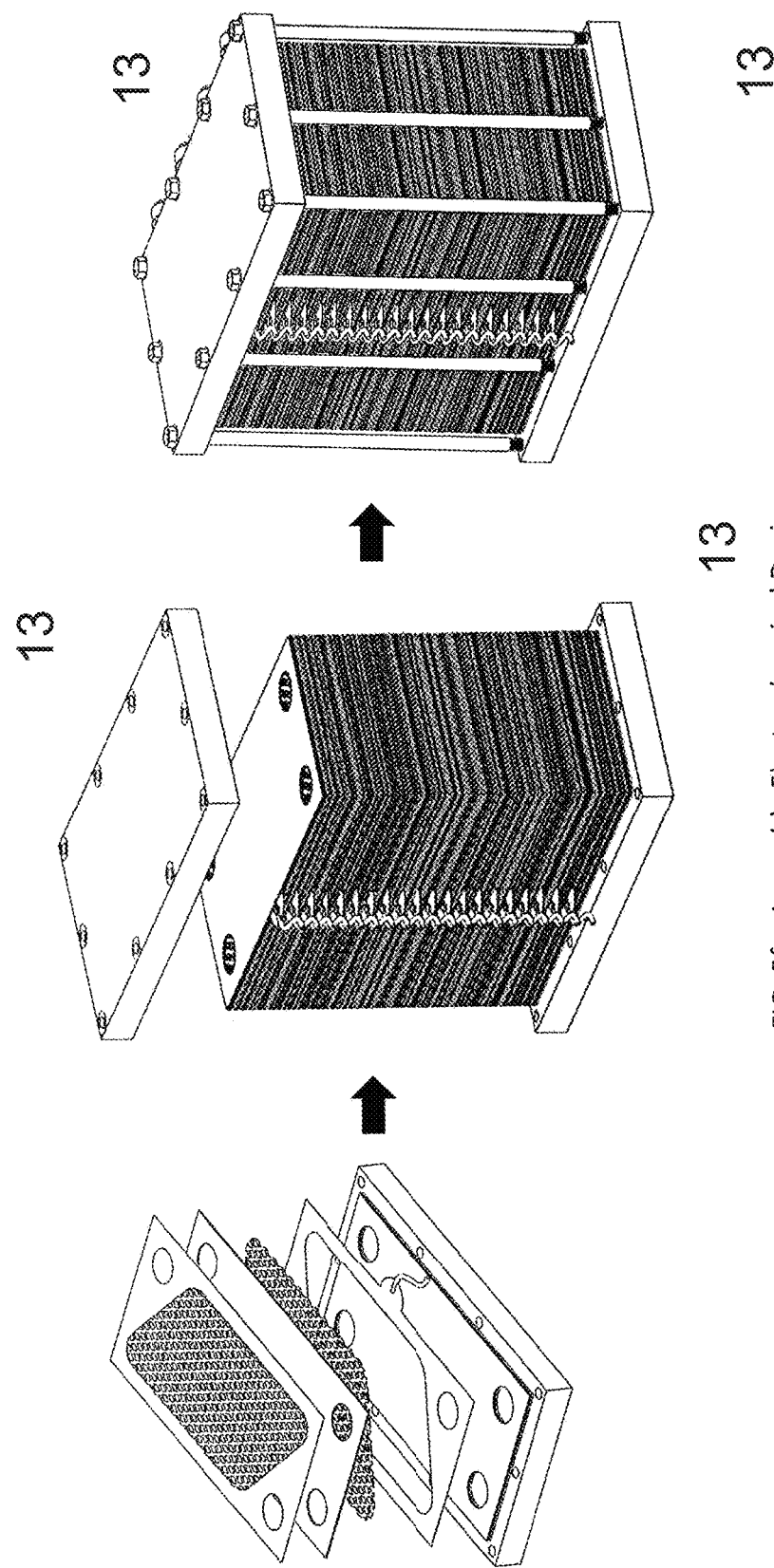
FIG. 5f – Assemble Electrochemical Device

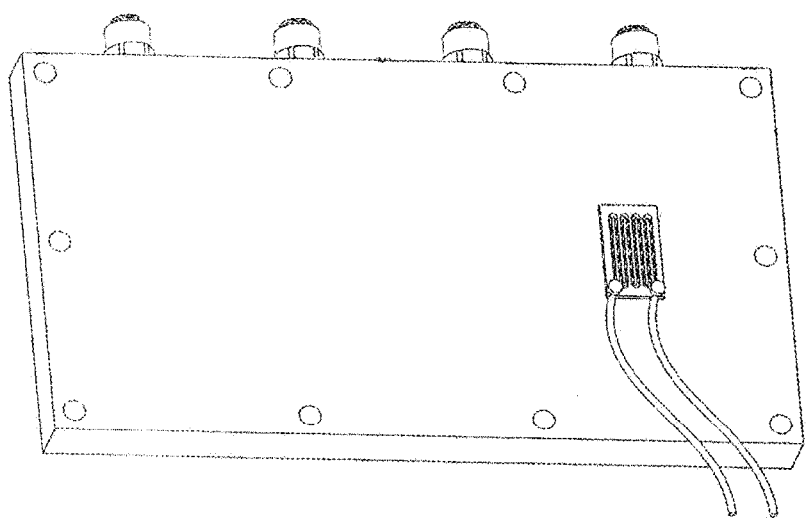
FIG. 6 – Top view of compression plate with embedded strain gauge

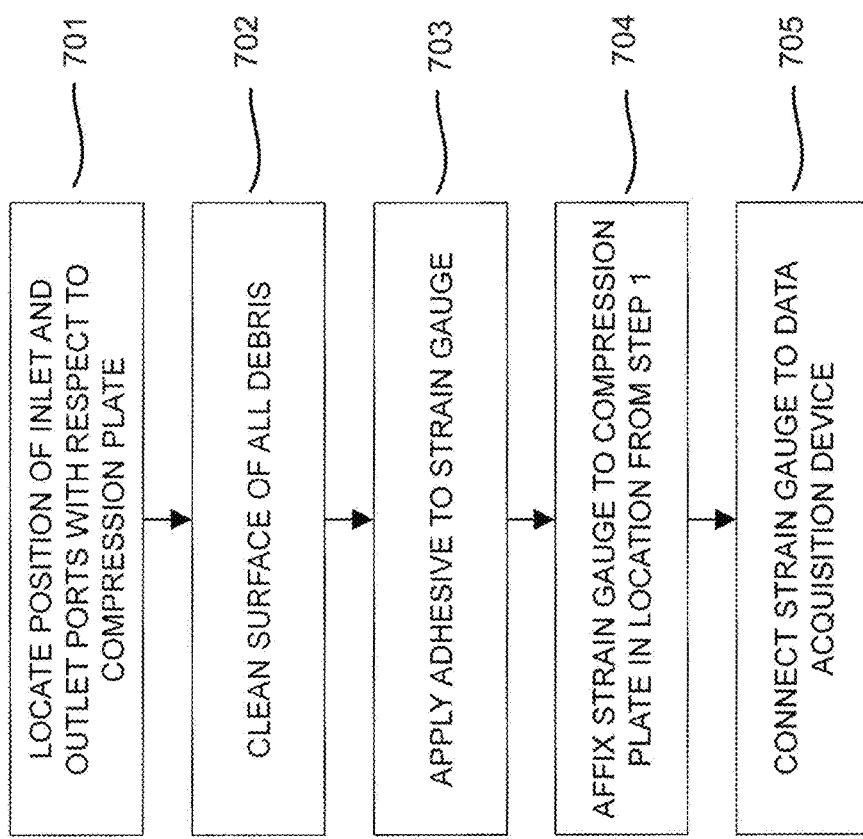
FIG. 7 – Manufacturing process for compression plate with embedded strain gauge

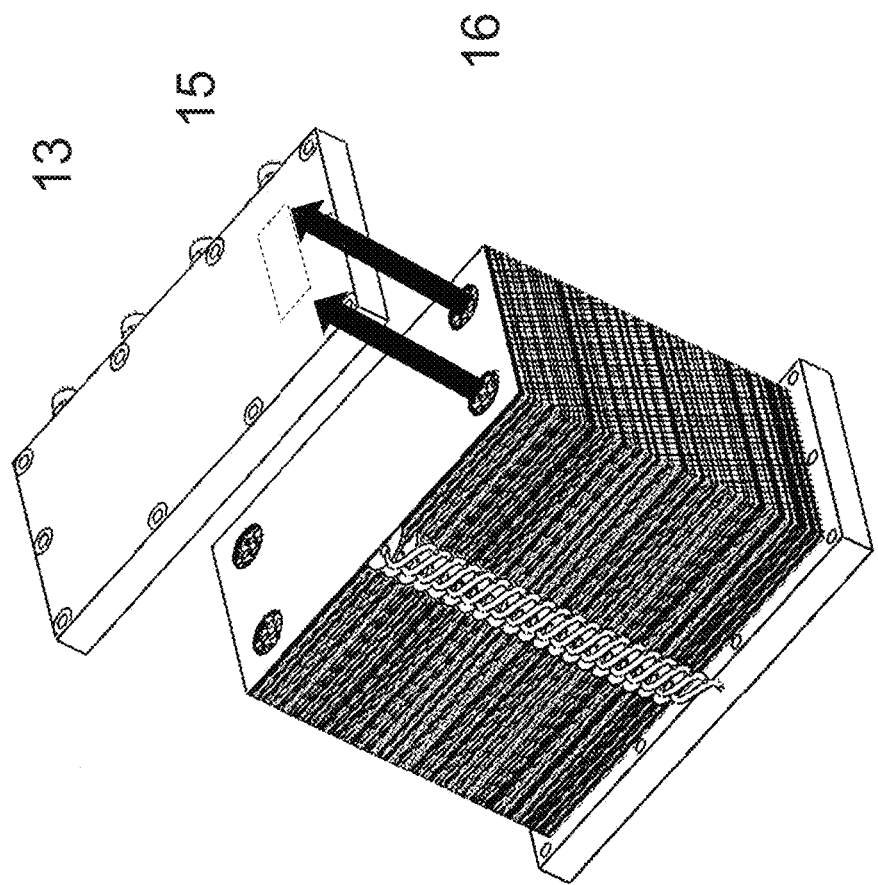
FIG. 7a - Locate Position of Inlet and Outlet Ports With Respect to Compression Plate

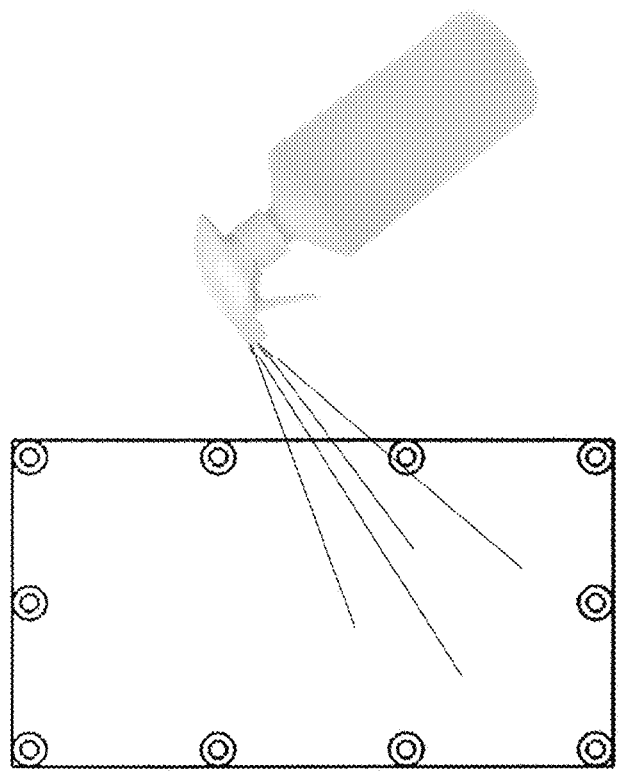
FIG. 7b – Clean Surface of All Debris

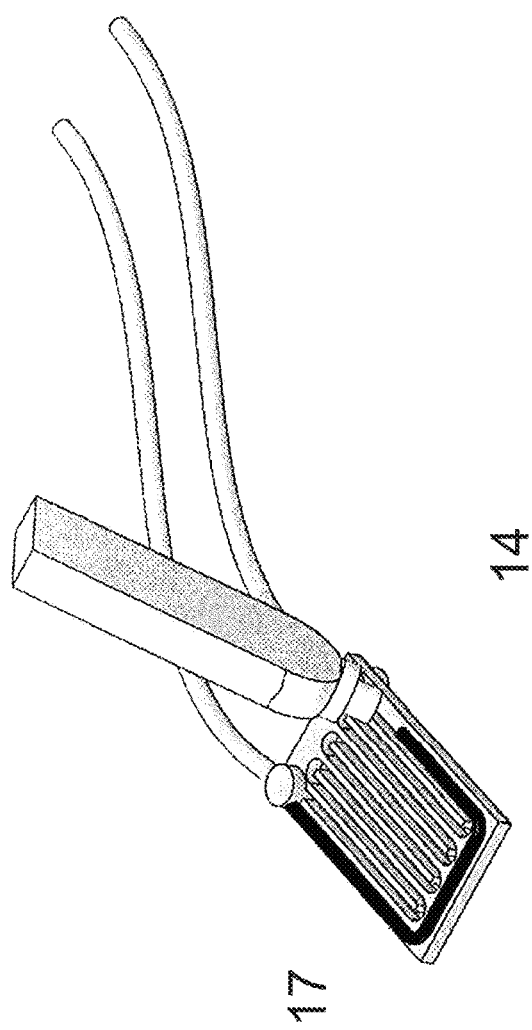
FIG. 7c – Apply Adhesive to Strain Gauge

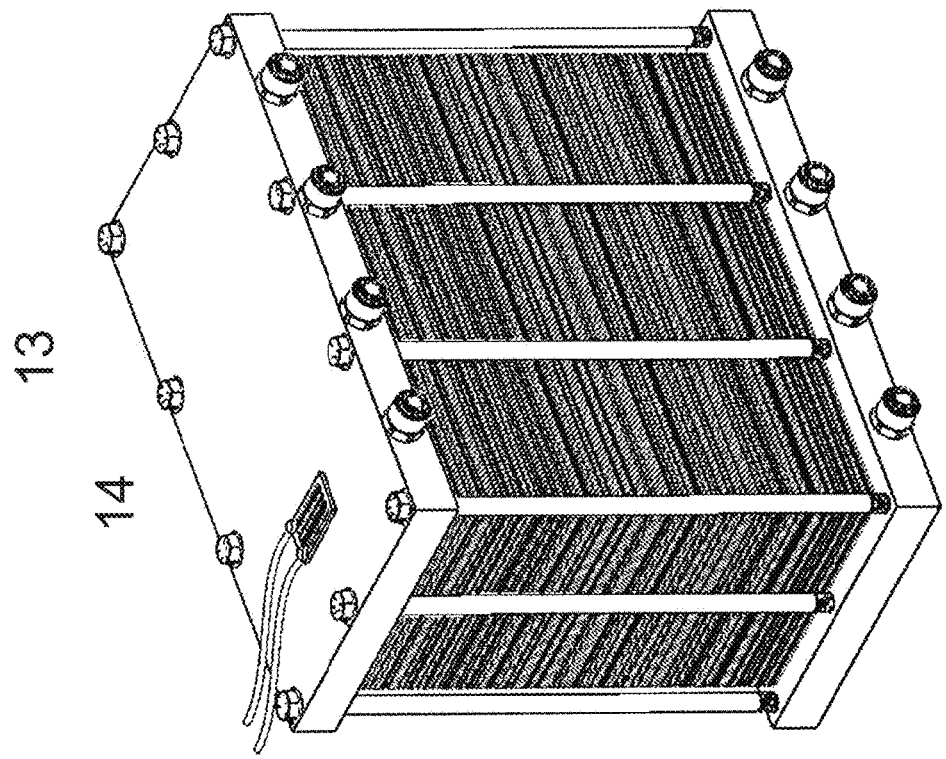
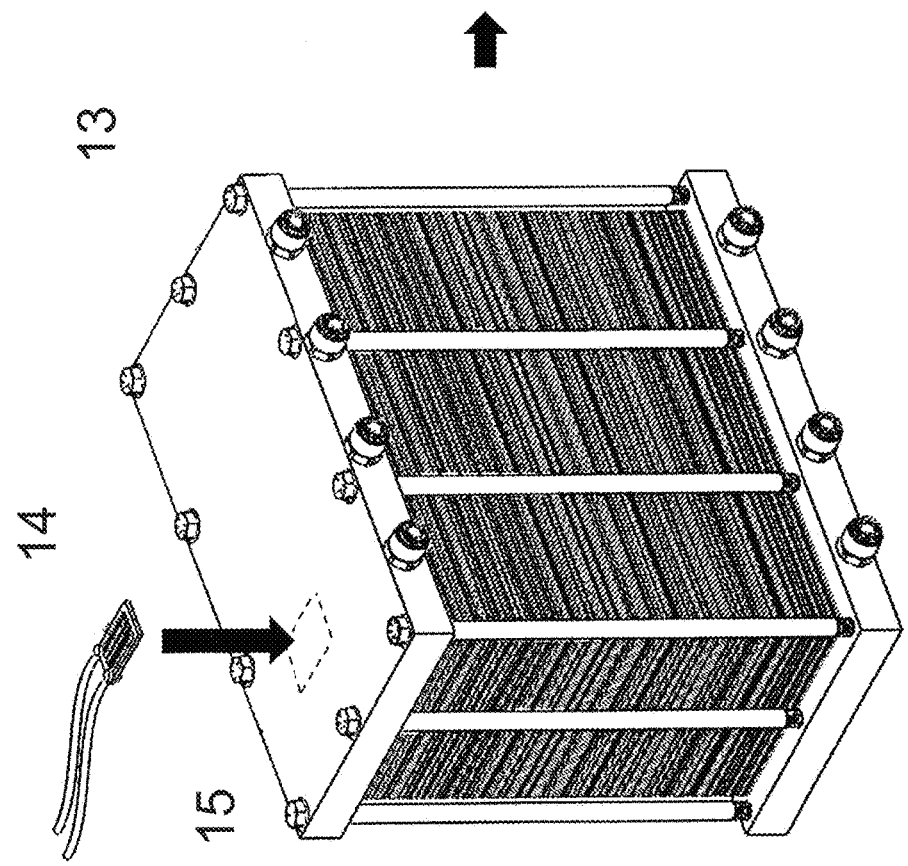
FIG. 7d – Affix Strain Gauge to Compression Plate in Location From FIG. 7a

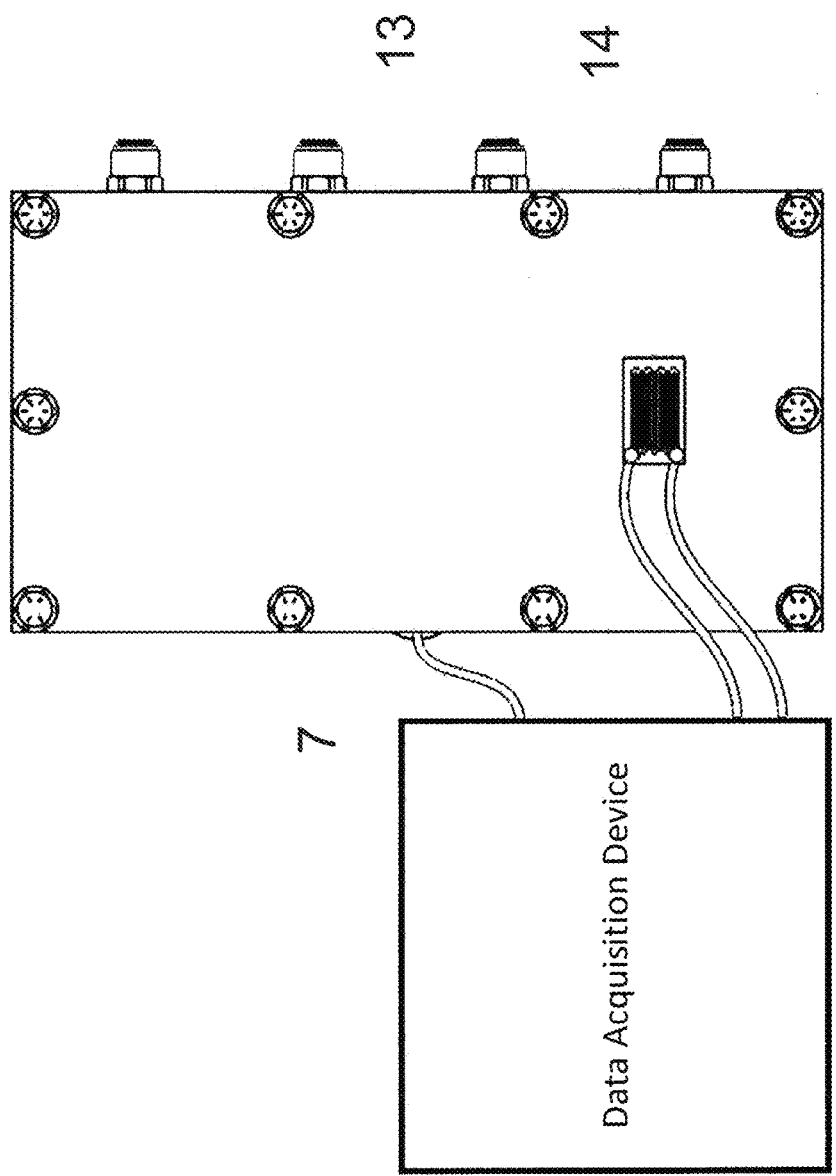

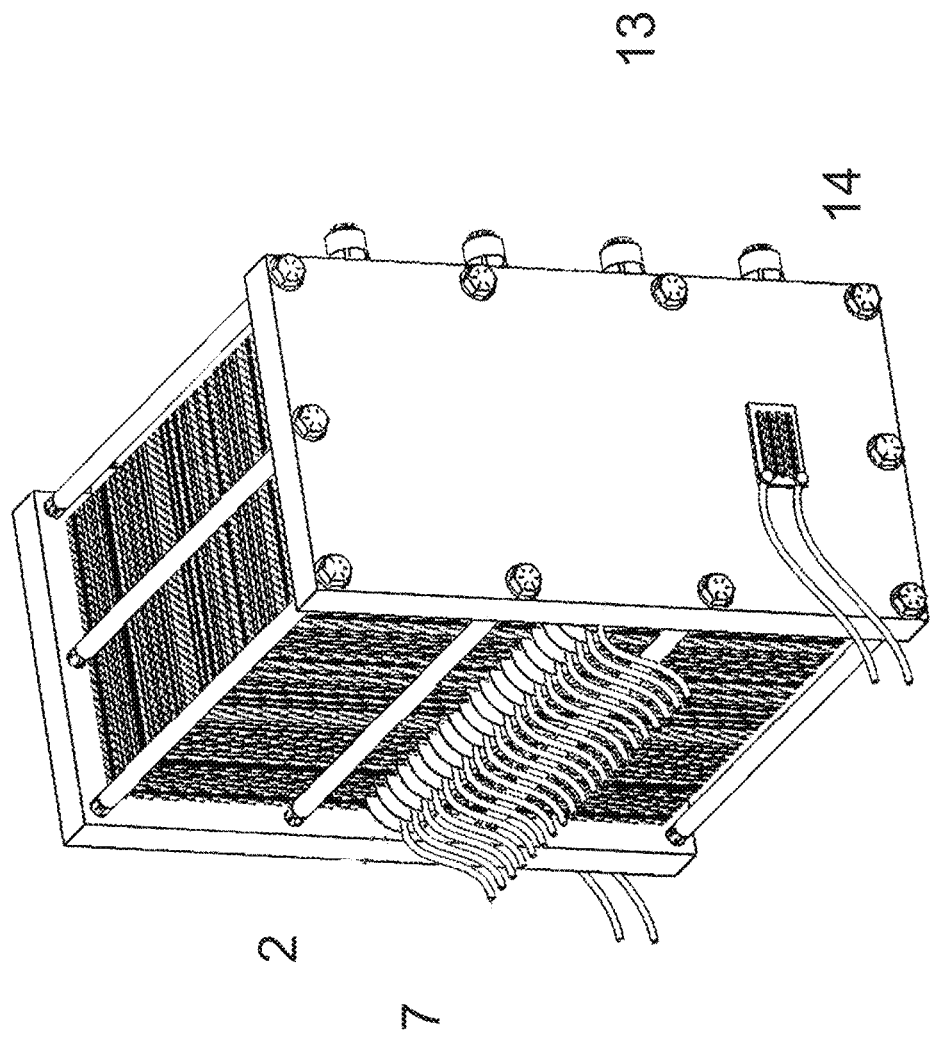
FIG. 8 – Assembled stack with Wires hanging out sides

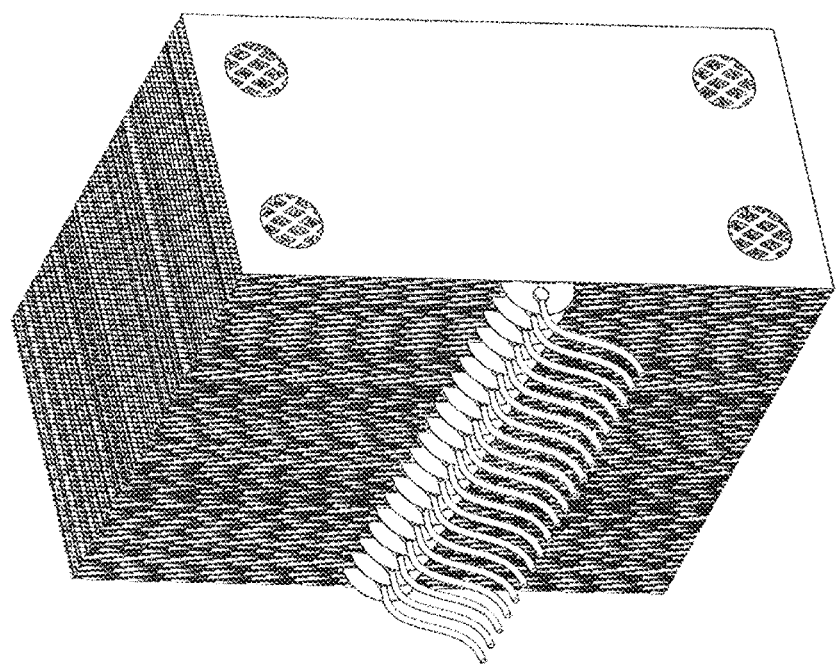
FIG. 9 – Stack of membranes and spacers with diagnostic spacers

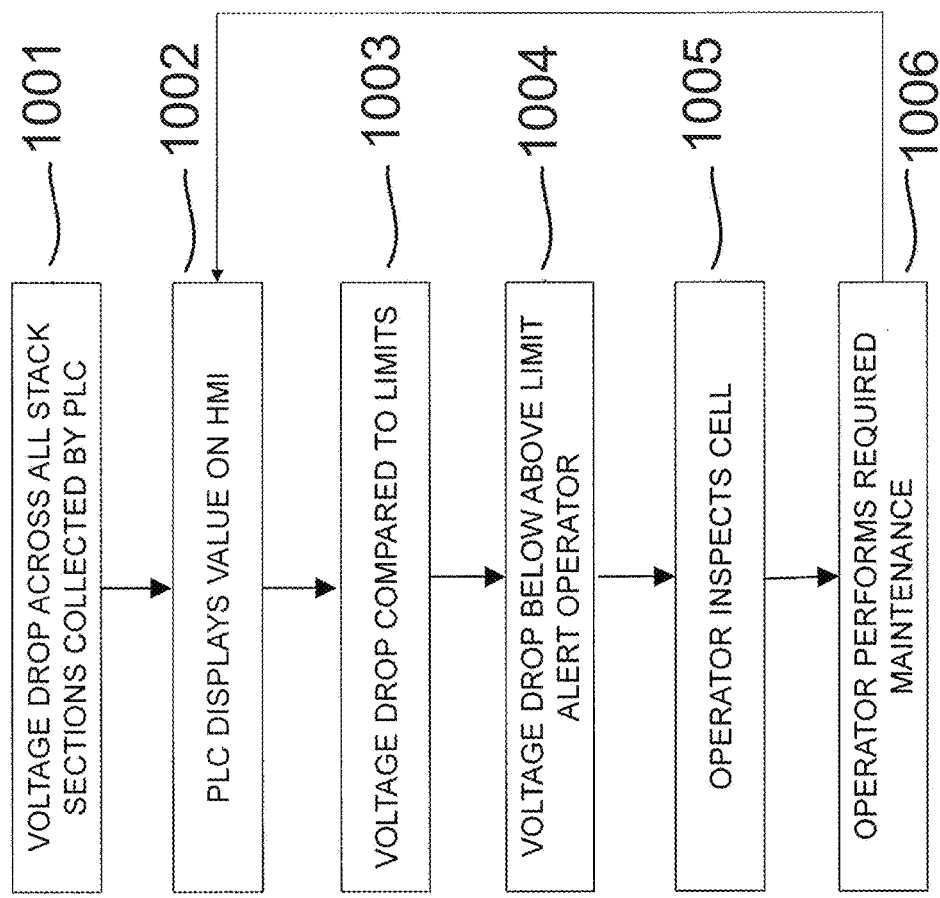
FIG. 10 - Feedback process diagnostic spacer

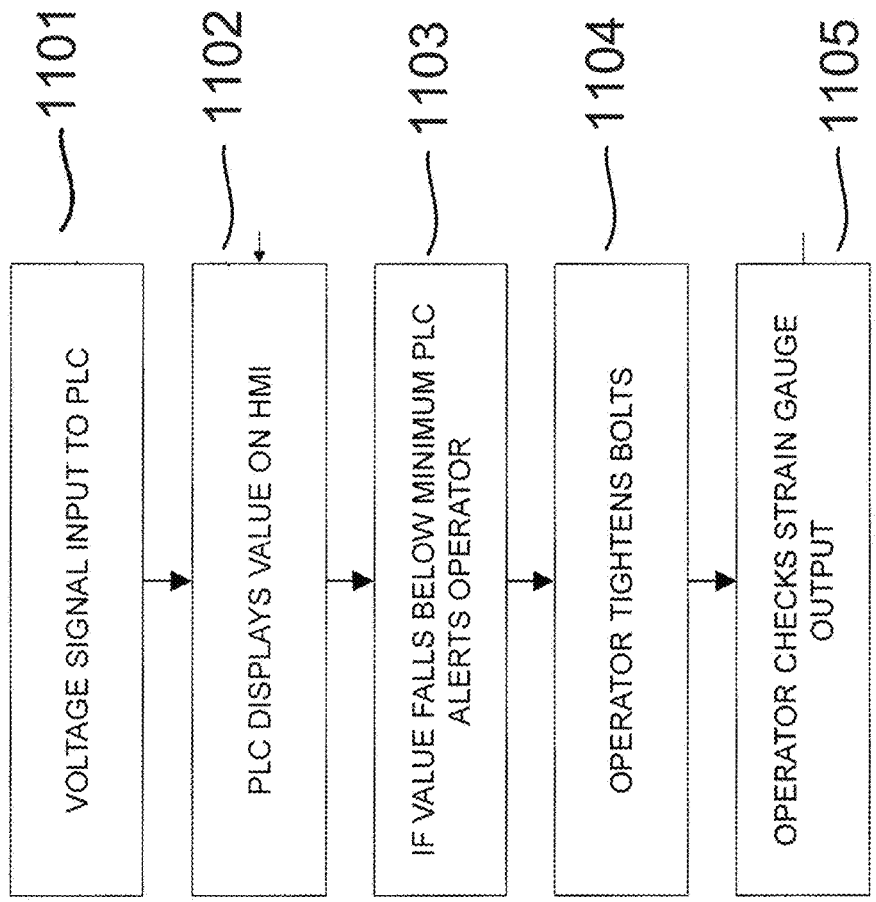
FIG. 11 — Feedback process for strain gauge

DIAGNOSTIC METHODS AND APPARATUS FOR ELECTRODIALYSIS

CROSS-REFERENCE TO RELATED APPLICATIONS

This application is a divisional application of U.S. patent application Ser. No. 16/600,416, filed Oct. 11, 2019, which claims the benefit of U.S. Provisional Application No. 62/745,010, filed Oct. 12, 2018, the entire contents of each of which are incorporated herein by reference.

FIELD OF THE DISCLOSURE

This disclosure relates to ion-exchange devices that can monitor key parameters related to the performance of the device during use. More specifically, this disclosure relates to ion-exchange devices capable of measuring voltage drop across groups of membrane pairs and monitoring the compression force applied by the compression plates holding the assembly together.

BACKGROUND OF THE INVENTION

The earliest forms of large scale desalination were thermal methods such as thermal distillation where the water is boiled and converted into steam, leaving behind the impurities, and the clean steam is collected and condensed. Unfortunately, this is a very energy intensive operation due to the requirement that the water undergo a phase change to separate the unwanted constituents. The energy required for this transformation is far greater than what would be required to separate the constituents if the water remained in the liquid phase.

In order to reduce the energy consumption, membrane based methods were created such as electro-chemical based electrodialysis and pressure driven reverse osmosis. In both of these methods, the water is purified through a membrane which allows the system to create potable water with reduced energy consumption. Electrodialysis can be used to selectively remove positive and negative ions from a water source (e.g., brackish water or the brine solution produced in reverse osmosis units) through transportation of salt ions from one solution to another via ion-exchange membranes upon application of an electrical current. An electrodialysis device can include a pair of electrodes (where a voltage is applied to initiate an electrochemical reaction), alternating anionic and cationic exchange membranes (which can selectively separate ions from one stream while concentrating said ions in adjacent streams from a dilute solution feed stream to a concentrate stream), and spacer materials. This electrochemical desalination method can provide an energy efficient desalination process. To increase the process capacity, pairs of ion exchange membranes can be stacked on top of each other to form stacks which can range from 1 pair to over 1000 pairs of ion exchange membranes.

Unfortunately, the nature of the stacks makes it inherently difficult to identify issues from the assembly process. The performance of a membrane stack can be tested by applying a voltage after assembly. However, if a cell fails to meet the expected metrics, there is currently no easy method of identifying the location of the assembly error much less if it was caused by improper membrane pair lay-up or unidentified damage to the components making up the membrane assembly. Existing attempts to obtain this information include wetting the side of the membrane assembly and forcing the tip of a volt meter into the side of the assembly. However, any readings from this method are inconsistent and endanger operators by placing them in contact with high direct current voltage (sometimes more than 600V). Furthermore, some assemblies may be sealed in such a way that makes the above described method unreliable or impossible to conduct.

As mentioned above, it is difficult to identify the root cause of various operational issues. These operational issues can include the formation of blockages for flow paths in a layer possible due to scale formation or ingress of solids into the system. Current methods for identifying such issues include the one stated above and monitoring hydraulic data to identify increased flow resistance. However, in order to see variations in hydraulic data can require a significant amount of blockage to form which can take a long time since scale formation is often very gradual.

Another common issue in electrochemical membrane assemblies can be the formation of internal leaks between cell pairs. Sealing between pairs of membranes is often accomplished using large plates typically compressed using blots or tie rods. Leakages typically form due to the gradual loosening of bolts over time or through variations in the thickness of the components of the membrane assembly itself. The membranes often include hydrophilic functional groups that attract water. This attraction can result in a swelling of the membranes. The degree of swelling can be directly related to the constituents in the fluid in contact with the membrane. Thus, under changing conditions the stack assembly, which often includes hundreds of membrane pairs, may change in size over time. The change in size may lead to insufficient compression from the compression plates which can cause the formation of internal leaks

BRIEF SUMMARY OF THE INVENTION

Applicants have discovered methods and apparatuses for monitoring key parameters relating to the performance of a membrane assembly during electrochemical ion separation such as desalination. Specifically, Applicants have discovered methods and apparatus for in situ monitoring of the voltage drop across groups of membrane pairs that compose the larger membrane assembly and monitoring the compression force applied by the compression plates holding the membrane assembly together.

In some embodiments, a diagnostic spacer border for an ion exchange device includes a groove in a surface of the spacer border; an electrode, wherein at least a portion of the electrode is in the groove; and a wire lead connected to the electrode. In some embodiments, the diagnostic spacer border includes an internal cavity, wherein a portion of the electrode protrudes from the groove into the internal cavity. In some embodiments, the wire lead and the electrode are connected by a solder joint. In some embodiments, the groove comprises a cured polymer solution. In some embodiments, the diagnostic spacer border includes a tab protruding from a perimeter of the spacer border away from the internal cavity. In some embodiments, the wire lead is connected to the electrode on the tab. In some embodiments, the tab is coated with a graphitic mixture. In some embodiments, the electrode is a wire electrode. In some embodiments, the wire electrode comprises titanium, platinum, or gold. In some embodiments, the electrode is a graphite electrode. In some embodiments, the electrode comprises a graphite electrode and a wire electrode.

In some embodiments, a method of making a diagnostic spacer border for an ion exchange device, the method includes etching a groove into a surface of a spacer border having an internal cavity; inserting a first portion of an electrode into the groove of the spacer border such that a second portion of the electrode protrudes from the groove into the internal cavity; applying a curable polymer solution to the groove; curing the curable polymer solution; and connecting a wire lead to the first portion of the electrode. In some embodiments, the wire lead is connected to the first portion of the electrode by soldering a solder joint between the wire lead and the first portion of the electrode. In some embodiments, the etching is laser etching or chemical etching. In some embodiments, the electrode is a wire electrode. In some embodiments, the wire electrode comprises titanium, platinum, or gold. In some embodiments, the electrode is a graphite electrode. In some embodiments, the electrode comprises a graphite electrode and a wire electrode.

In some embodiments, an ion-exchange device includes a pair of electrodes comprising an anode and a cathode; a first ion exchange membrane and a second ion exchange membrane between the pair of electrodes, a diagnostic spacer border between the first ion exchange membrane and the second ion exchange membrane, the diagnostic spacer border comprising: a groove in a surface of the spacer border; an embedded electrode, wherein at least a portion of the embedded electrode is in the groove; and a wire lead connected to the embedded electrode. In some embodiments, the first ion exchange membrane is a cation exchange membrane and the second ion exchange membrane is an anion exchange membrane.

In some embodiments, an ion-exchange device includes a pair of compression plates, wherein at least one of the compression plates comprises a strain gauge on an outer surface of the at least one compression plate; a pair of electrodes comprising an anode and a cathode between the pair of compression plates; a first ion exchange membrane and a second ion exchange membrane between the pair of electrodes, wherein the first ion exchange membrane comprise at least two inlet or outlet ports, wherein the strain gauge is located at a position on the outer surface of the at least one compression plate corresponding to a point between the at least two inlet or outlet ports of the first ion exchange membrane. In some embodiments, the first ion exchange membrane is a cation exchange membrane and the second ion exchange membrane is an anion exchange membrane. In some embodiments, the position of the strain gauge on the outer surface of the at least one compression plate is equidistant between the at least two inlet or outlet ports of the first ion exchange membrane. In some embodiments, the strain gauge is connected to a data acquisition device. In some embodiments, the strain gauge is attached to the outer surface of at least one compression plate via adhesive.

Additional advantages will be readily apparent to those skilled in the art from the following detailed description. The examples and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE DRAWINGS

Exemplary embodiments are described with reference to the accompanying figures, in which:

FIG. 1 illustrates an example of a schematic side view of an ion-exchange system disclosed herein.

FIG. 2 illustrates an example of an exploded view of the flow channels through an ion-exchange system disclosed herein.

FIG. 3 illustrates an example of an isometric view of a diagnostic spacer border disclosed herein.

FIG. 4 illustrates an example of an isometric view of a diagnostic spacer border with a close up view of the embedded spacer border electrode disclosed herein.

FIG. 5 illustrates an example of a flow diagram for making an ion-exchange device with at least one diagnostic spacer border disclosed herein.

FIG. 5A illustrates an example of a wire electrode being cut to size as well as a CNC laser cutter cutting a diagnostic spacer border.

FIG. 5B illustrates an example of a groove being laser etched in a surface of a spacer border and an electrode being embedded within the groove.

FIG. 5C illustrates an example of a filler material being applied to the groove containing the embedded electrode.

FIG. 5D illustrates an example of a curing process for a diagnostic spacer border disclosed herein FIG. 5E illustrates an example of a wire lead being soldered to the embedded electrode.

FIG. 5F illustrates an example of a stack assembly of an electrochemical device containing a diagnostic spacer border disclosed herein.

FIG. 6 illustrates an example of a strain gauge affixed to a compression plate of an electrochemical device.

FIG. 7 illustrates an example of a flow diagram for making a compression plate with a strain gauge for an electrochemical device disclosed herein.

FIG. 7A illustrates an example where the position of the inlets or outlet ports of a membrane (AEM or CEM) is located with respect to the compression plate.

FIG. 7B illustrates an example of a compression plate being cleaned.

FIG. 7C illustrates an example of an adhesion being applied to a strain gauge.

FIG. 7D illustrates an example of a strain gauge being installed on a compression plate at the predetermined critical location on the compression plate.

FIG. 7E illustrates an example of a strain gauge installed on a compression plate and communicating with a data acquisition device.

FIG. 8 illustrates an example of an assembled electrochemical ion separation device with diagnostic spacer borders and strain gauges installed.

FIG. 9 illustrates an example of a stack assembly of an electrochemical device without compression plates.

FIG. 10 illustrates an example of a flow diagram of a feedback loop for required maintenance identified by diagnostic spacer borders disclosed herein.

FIG. 11 illustrates an example of a flow diagram of a feedback loop for required maintenance identified by the strain gauges disclosed herein.

Unless stated otherwise, like reference numbers in the Figures refer to the same component.

DETAILED DESCRIPTION OF THE INVENTION

Voltage drops across membrane pairs and the membrane assembly can be an indication of the internal health of the system. Operational parameters that can result in variations in pressure drop include, but are not limited to, blockages, internal leaks, and scale formation. Applicants have discovered a way to actively monitor the voltage drop across various membrane groups using a system of embedded diagnostic electrodes.

The ion-exchange systems and devices disclosed herein can include at least one pair of electrodes and at least one pair of ion exchange membranes placed there between. The at least one pair of ion exchange membranes can include a cation exchange membrane and an anion exchange membrane. In some embodiments, at least one of the cation exchange membrane and anion exchange membranes has spacers on the surface facing the other exchange membrane in the ion exchange system/device, as disclosed in U.S. Provisional Application No. 62/689,357, which is hereby incorporated by reference in its entirety.

FIG. 1 illustrates an example of a schematic side view of an ion-exchange system disclosed herein. As shown in FIG. 1, pairs of cation exchange membranes ("CEMs") and anion exchange membranes ("AEMs") can be sandwiched between two electrodes on opposite ends of the device. One electrode can be a cathode and the other electrode can be an anode. These electrodes can encompass a series of fluid channels. These fluid channels can be separated by the ion exchange membranes (e.g., cation exchange membrane and anion exchange membrane). At least some of these fluid channels can receive an influent stream. The influent stream can be water to be purified and can be flowed through the channels in between the alternating anionic and cationic exchange membranes. Anion exchange membranes can preferentially allow passage of negatively charged ions and can substantially block the passage of positively charged ions. In contrast, cation exchange membranes can preferentially allow the passage of positively charged ions and can substantially block the passage of negatively charged ions.

The electrolyte fluid channels and streams can be in direct contact with the electrodes. In addition, these electrolyte streams may include the same or different fluid as the fluid entering the influent. For example, the electrolyte streams can be a variety of conductive fluids including, but not limited to, raw influent, a separately managed electrolyte fluid, NaCl solution, sodium sulfate solution, or iron chloride solution.

In an ion exchange system such as the one shown in FIG. 1, when an electric charge is applied to the electrodes, the ions in the influent stream flowing in the channels between the ion exchange membranes can migrate towards the electrode of opposite charge. The alternating arrangement of the ion exchange membranes can thus produce alternating channels of decreasing ionic concentration and increasing concentration. The number of channels between the ion exchange membranes may be increased through the addition of more alternating pairs of membranes to increase the capacity of the ion exchange system/device. In addition, the functioning ability of an individual ion exchange cell can be greatly augmented by configuring ion exchange cells into ion exchange stacks (i.e., a series of multiple ion exchange cells.)

The influent stream can be converted into a brine stream which is typically waste and a product/diluate stream. The product stream can have a lower ionic concentration. In some embodiments, the product stream can have a predetermined treatment level. For example, the ion exchange system can remove many types of ions or it could focus or be selective to a specific ion type. Examples of groups of ions can include, but are not limited to, monovalent and divalent. Examples of specific ions can include, but are not limited to, arsenic, fluoride, perchlorate, lithium, gold, and silver. They ion exchange system can be held together using a compression system represented in FIG. 1 by two compression plates on opposite ends of the device.

To create the fluid channels between the membranes, spacer borders can be inserted between the membranes. FIG. 2 illustrates an exploded view of three membranes, two mesh spacers, two spacer borders as well as the fluid flow path through these components. Specifically, the fluid flow path is shown to be sequentially cation exchange membrane, spacer mesh/spacer border, anion exchange membrane, spacer mesh/spacer border, and cation exchange membrane. Pairs of membranes require separation to allow fluid to flow between them. Typically, a non-conductive spacer/spacer border can provide the separation between the membrane pairs. In actual use, these components can be sandwiched together such that the spacer border can seal against the membranes and provide contained flow channels/pathways for the fluid to be treated.

When these components are sandwiched together, the holes in the corners of the various components shown in FIG. 2 can create inlet and outlet manifolds. The large internal cavity of the spacer border can include a spacer (e.g., mesh or netting) used to maintain separation between membranes in the system. In addition, the spacers can provide torturous paths for the fluid to flow that can increase the turbulence of the fluid flow.

Each membrane can include four holes which when combined with the spacer borders create a manifold along the length of the electrochemical cell. The manifold holes and the geometry of the spacers can allow fluids to flow into and through the contained area created by the spacer border. In FIG. 2, fluid can be introduced along the bottom, inlet manifolds and flow up and across the spacer mesh to the top, outlet manifolds.

The first spacer border (from left to right) in FIG. 2 is a diagnostic spacer border. An isometric view of a diagnostic spacer border is illustrated in FIGS. 3 and 4. As shown in FIGS. 3-4, spacer border 1 can include at least one tab 2. In some embodiments, a diagnostic spacer border can include multiple tabs. The tab can be a protrusion from the perimeter (i.e., the external wall) of the spacer border. This protrusion(s) can be in a variety of shapes and sizes. For example, tab 2 in FIGS. 3-4 is a semicircle protrusion. However, the tab(s) can be semi-square, semi-rectangular, or a variety of other shapes. In addition, tabs do not have to be located at the center of one side of the spacer border. In fact, a side of the spacer border can include multiple tabs which can be spaced at various locations along the side of the spacer border. In some embodiments, the tab can be on a length (L) side of the spacer border as shown in FIG. 3. In some embodiments, the tab can be on a width (W) side of the spacer border.

The diagnostic spacer border can include at least one embedded electrode 3. The embedded electrode can provide a voltage lead between the internal chamber 4 and outside 5 of the spacer border. In addition, the embedded electrode can extend into the internal cavity of the spacer border such that it has a large area of electrical contact with any fluid that flows through the internal cavity of the spacer border. The portion of the electrode disposed to the internal cavity of the spacer border can directly contact fluids being treated by the membrane assembly. The diagnostic spacer border can also include a solder joint 6 that creates an electrical junction between the embedded electrode and a wire lead 7. The wire lead can then be connected to a volt meter. The tab can provide additional strain relief and support to the embedded electrode and a place to fasten the volt meter lead.

The embedded electrode can be affixed in a groove 8 cut in the spacer border using a curable polymer solution 9. FIG. 5 illustrates an example of a flow diagram for making an ion-exchange device with at least one diagnostic spacer border disclosed herein. In step 501, raw materials for the diagnostic spacer border are cut to size. These materials include the spacer border itself as well as embedded electrode material and wire leads for the spacer border. FIG. 5A includes illustrations of a wire embedded electrode 3 being cut to size as well as a CNC lase cutter 500 cutting the diagnostic spacer border 1.

In step 502, the diagnostic spacer border has a groove etched into a surface of the spacer border that allows an electrode to be embedded within. The groove can be etched with laser etching, chemical etching, abrading, or cutting into the surface of the spacer border to allow an electrode to be embedded within the groove. In some embodiments, the groove 8 extends only partially through the surface of a spacer border as shown in FIG. 5B. In other embodiments, etching the groove may remove all the spacer border material in the path of the wire, thereby extending through the entire surface of the spacer border. In such an embodiment, the removed spacer material in the path of the electrode can be replaced with the curable polymer solution, as explained below. The electrode 3 can be embedded within the groove such that a portion of the electrode protrudes from the groove into the internal cavity 4 of the diagnostic spacer border. The electrode may be placed in the groove such that it does not extend above the top surface of the spacer border.

In some embodiments, the embedded electrode is an inert electrode. In some embodiments, the embedded electrode can be an inert metal wire such as titanium, platinum, or gold between 0.001" and 0.020" thick. In some embodiments, the embedded electrode can be graphite or graphite composite. Such a graphite electrode can be applied to a groove in the spacer border using a mixture of a surfactant, a binding agent, and graphitic carbon powder. For example, one mixture can include isopropyl alcohol, nafion ionomer, and carbon black. A graphite electrode can avoid using a small diameter wire (which may be prone to breaking if subjected to repeated mechanical stress via the electrical contact) in the groove of the diagnostic spacer. A tab on the outside of the spacer may also be coated with the graphitic mixture to create a contact pad by which an electrical lead may be attached by mechanical fastener such as a lug or clamp. In some embodiments, a combination of a wire electrode and a graphite electrode can be used in the diagnostic spacer border. When a combination of a wire electrode and a graphite electrode are used, the wire can be placed in the groove such that a lead is disposed to the internal cavity of the spacer border. Next, the graphitic mixture can be injected around the wire electrode to fill the gaps in the groove and to coat the externally disposed tab. The tab extending from the external wall of the spacer border may be coated to supply an electrical contact for a voltmeter to attach. A doctor blade can be used to wipe away excess material and create a flat surface with the top of the spacer border. Such combination embodiments can alleviate concerns of breaking a thin wire electrode lead while also maintaining the ability to make good electrical contact with the internally disposed surface of the spacer border.

In step 503, a filler material such as a curable polymer solution can be applied to the groove containing the embedded electrode in the spacer border. The filler material can fill the voids between the spacer border and the embedded electrode in the groove. FIG. 5C illustrates an example of a filler material being applied to the groove containing the embedded electrode. A doctor blade 10 can be used to scrape the top surface of the spacer border adjacent the groove such that the filler material in the groove and the top surface of the spacer border adjacent the groove are level. In other words, the filled groove and the top surface of the spacer border are level forming a uniformly flat surface such that the spacer border can still be used as a flat seal for two membranes. Besides filling the void spaces in the groove, the filler material can also hold the electrode in place in the groove. In addition, the filler material should be applied such that the surface is void of breaks of leak paths.

If the filler material is a curable polymer solution, the curable polymer solution is cured in step 504. FIG. 5D illustrates an example of a curing process using, for example, an array of UV light bulbs 11 for the curable polymer solution in the groove of the spacer border. The curing process can lock the embedded electrode in place and can create a sealing surface between the membrane and the spacer border because the cured filler material in the groove and the top surface of the spacer border adjacent the groove form a uniformly flat surface.

In step 505, a wire lead can be connected to the embedded electrode. This connection can be connected by a solder joint 6 formed by a soldering device 12 as shown in FIG. 5E. Wire lead 7 can be connected to electrode 3 on the non-wetted tab 2 on the spacer border 1. Non-wetted refers to the external surface that does not come into contact with the fluids inside the electrodialysis device. This wire lead can connect the embedded electrode to a data acquisition device (e.g., voltage meter) such that the data acquisition device can obtain live voltage readings from the ion exchange device. The wire lead can extend outside of the cell to be attached to a data acquisition device. Due to the small dimensions of the in-situ electrode, reinforcement of the connection to the voltage lead may be required. In some embodiments, the tab can be coated with a graphitic electrode mixture to provide a conductive pathway between the internally disposed metal wire to the volt meter lead.

In step 506, an electrochemical device can be assembled. A membrane stack can include one or many diagnostic spacer borders placed regularly throughout the membrane stack. For example, FIG. 5F illustrates an example of an assembly of an electrochemical device containing multiple diagnostic spacer borders placed at regular intervals along the length of the cell. The electrochemical device can include compression plates 13 on opposite ends of the device. FIG. 9 illustrates an example of a stack assembly of an electrochemical device without compression plates. In some embodiments, the diagnostic spacer borders are arranged to alternate between product and brine chambers. This can allow voltage drop readings from two brine chambers at a given time. The brine chambers can allow for a more consistent measurement due to the elevated conductivity in the brine chambers. In many electrochemical ion separation processes such as electrodialysis and electrodeionization, the system polarity can be periodically reversed which can result in a change in location of the product and brine chambers. By alternating between product and brine chambers with a diagnostic spacer border, an operator can obtain readings from two brine chambers regardless of the polarity of the system.

After assembly and during operation, the voltage drop across the diagnostic spacers placed at regular intervals can be monitored to verify expected performance and monitor trends. The initial assembly may result in irregularities in performance due to improper lay up of membranes. However, these anomalies can be readily identified using the in situ voltage drop monitoring. The defective region can be identified and removed, where previously the entire stack would have had to be entirely reassembled. During operation of the electrochemical device, trends in the voltage drop data can allow early identification of regions of the device that may be being affected by scale formation and/or blockage. As such, an operator can provide corrective maintenance more readily than in the previous designs described in the Background of this application.

In larger membrane assemblies, it may be advantageous to have many of the voltage leads. The signals from these leads can be collected to be reported to an operator. A multiplexer may be used to collect the large number of signals to be processed by a programmable logic controller (PLC) or data acquisition device. The PLC may also determine which diagnostic electrodes are in contact with what brine chambers. The brine chambers typically have a much greater conductivity than a dilute chamber and can provide superior precision for the voltage drop measurement in the cell.

FIG. 10 illustrates an example of a flow diagram of a feedback loop for required maintenance identified by diagnostic spacer borders disclosed herein. In step 1001, the voltage drop across all stack sections can be collected by a PLC. In step 1002, the PLC can display values on Human Machine Interface ("HMI"). HMI is a software application that runs on a screen located at or near a piece of process equipment. It can allow an operator to interact with the machine using digital buttons on the screen. At step 1003, the various measured voltage drops can be compared to threshold limit voltage drops. In step 1004, if the measured voltage drop is below or above the threshold voltage drop limits, an operator can be alerted. At step 1005, an operator can inspect the device in the areas alerted to him by the PLC. In step 1006, if maintenance is required, the operator can perform the required maintenance and then the process can pick back up again at step 1002.

In some embodiments, multiple electrodes can be placed and embedded along the perimeter of the interior cavity of the spacer border. This can allow for more detailed monitoring of the internal characteristics of the system within a given layer. For example, the location of a potential blockage may be more accurately identified. In addition, the mapping of the internal flow patterns within a layer and irregularities in the rate of salt removal may also be accomplished. Furthermore, problems with the electrodes can be identified if a region along the membrane does not appear to be operating properly, i.e., removing salt.

In addition to voltage drop monitoring, proper compression can be essential for maintaining membrane assembly performance. Internal and external leaks can result in parasitic performance losses and can potentially lead to hazardous conditions for operators. Active monitoring of compression can be accomplished with a strain gauge mounted to the compression plates used to hold the membrane assembly together.

FIG. 6 illustrates an example of strain gauge 14 affixed to compression plate 13 of an electrochemical device. Such a compression plate can pair with another compression plate to encapsulate a stack of ion exchange membranes. FIG. 7 illustrates an example of a flow diagram for making a compression plate with a strain gauge for an electrochemical device disclosed herein. A strain gauge can be affixed to a location on the compression plate where the two inlet or outlet streams (product and brine) intersect as they travel through the membranes sandwiched between the compression plates. In other words, a strain gauge(s) can be placed on the region/location of the compression plate directly over the location of the internal inlet or outlet manifolds between membrane pairs. The compression at this location can be essential for providing proper sealing between layers. This intersection poses the greatest risk from internal leaking between layers in the cell (i.e., cross contamination flow). Without this seal, brine or electrode rinse solutions may leak into the treated fluid which can affect the quality of the product fluid and decrease the energy efficiency of the system. The strain gauge can return a voltage signal under different loads applied by the bolts. As compression is applied to the cell, the deflection in the gauge can correspond with the amount of force applied to the compression plate(s).

In step 701, the position of the inlet and/or outlet ports are located with respect to the compression plate. FIG. 7A illustrates an example where the position 15 of the inlets or outlet ports 16 of a membrane (AEM or CEM) is located with respect to the compression plates. The position 15 can be at a point that is between the two inlet or outlet ports of the membrane on the opposite side of the compression plate. In some embodiments, the position is equidistant between the two inlet or outlet ports.

In some embodiments, there may be more than two inlet or outlet ports. As such, the position can be at a point near the center of the compression plate between or just below the center most ports. In such embodiments, when the strain gauge is affixed to the compression at such a position, the strain gauge can measure the change in deflection and still serve the same purpose as in the case of which one pair of inlet or outlet ports. The central location can be important as this position on the compression plate can see the greatest amount of deflection compared to the uncompressed state.

This position is where the strain gauge(s) will be affixed on the external side of the compression plate opposite the membranes. Placing the strain gauge or gauges in this location can provide the most accurate indication of changes that may affect the internal sealing of the assembly. In some embodiments, the strain gauge(s) can be placed far away from bolts or edges of the compression plate such that deflection will result in a more pronounced signal.

Before the strain gauge(s) can be added to the compression plates, the compression plates should be cleaned of all debris (step 702). FIG. 7B illustrates an example of a compression plate being cleaned of all debris on the surface of the compression plate where the strain gauge(s) will be located. In step 703, an adhesive 17 can be applied to the strain gauge 13 prior to application to the compression plate as shown in FIG. 7C. After the adhesive is applied to the strain gauge, the strain gauge can be affixed to the compression plate at the position/location determined in step 701 (step 704) as shown in FIG. 7D.

FIG. 8 illustrates an example of an assembled electrochemical ion separation device with diagnostic spacer borders and strain gauges installed. As explained above, the positioning of the diagnostic spacer borders (e.g., every 10-50 cell pairs) can allow for sections of the assembled stack to be tested individually or in combination with adjacent sections. The voltage leads 7 can be attached to a multiplexer or directly to digital inputs on a data acquisition device or PLC. As explained above, the strain gauges can be placed on the stack in a location corresponding to the internal intersection of the product and brine streams.

FIG. 7E illustrates an example of a strain gauge installed on a compression plate and communicating with a data acquisition device (step 705). Changes to the amount of compression over time can be monitored by a PLC or data acquisition device. FIG. 11 illustrates an example of a flow diagram of a feedback loop for required maintenance identified by the strain gauges disclosed herein.

In step 1101, the voltage signal from the strain gauge can be input to a PLC. Changes to the amount of compression over time can be monitored by the PLC. In step 1102, the PLC can display values on HMI. At step 1103, the various measured voltage signals can be compared to threshold limit for voltage signal. If the measured voltage signals fall below the threshold voltage signals, an operator can be alerted. At step 1104, an operator can inspect the device in the areas alerted to him by the PLC and can then perform required maintenance if necessary to retighten the compression system such as tightening the bolts between compression plates. In step 1105, the operator can then check the strain gauges after performing the maintenance to make sure that the strain is now within the threshold boundaries and then the process can pick back up again at step 1102. During the maintenance operation, the output from a strain gauge can indicate when adequate compression is reapplied. Preventative maintenance of this type can prevent loss of performance or damage to cell components. As such, the system can aid in original assembly by providing feedback in the manufacturing process to guarantee adequate compression prior to commissioning.

In some embodiments, the compression can be monitored via measurement of distance between the compression plates. For example, a light source can be reflected off of the opposite compression plate and then captured by a sensor on the device. The time between generating the light signal and capturing the returned light can be converted into the distance between two points. By measuring the distance at multiple locations around the perimeter of the electrochemical ion separation device's compression plates, the uniformity of the compression can be monitored. A lack of uniformity in compression can lead to poor flow distribution and thus poor performance.

Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters. For example, the spacing between ion exchange membranes can be less than about 1000 microns, about 500 microns, or about 250 microns is meant to mean that the spacing between ion exchange membranes can be less than about 1000 microns, less than about 500 microns, or less than about 250 microns.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

The invention claimed is:

1. An ion-exchange device comprising:
    a pair of compression plates, wherein at least one of the compression plates comprises a strain gauge on an outer surface of the at least one compression plate;
    a pair of electrodes comprising an anode and a cathode between the pair of compression plates;
    a first ion exchange membrane and a second ion exchange membrane between the pair of electrodes, wherein the first ion exchange membrane comprise at least two inlet or outlet ports,
    wherein the strain gauge is located at a position on the outer surface of the at least one compression plate corresponding to a point between the at least two inlet or outlet ports of the first ion exchange membrane.

2. The device of claim 1, wherein the first ion exchange membrane is a cation exchange membrane and the second ion exchange membrane is an anion exchange membrane.

3. The device of claim 1, wherein the position of the strain gauge on the outer surface of the at least one compression plate is equidistant between the at least two inlet or outlet ports of the first ion exchange membrane.

4. The device of claim 1, wherein the strain gauge is connected to a data acquisition device.

5. The device of claim 1, wherein the strain gauge is attached to the outer surface of at least one compression plate via adhesive.

* * * * *